(12) United States Patent
Nakanishi et al.

(10) Patent No.: US 8,094,970 B2
(45) Date of Patent: Jan. 10, 2012

(54) ROAD IMAGE CREATION SYSTEM

(75) Inventors: Kenta Nakanishi, Aichi (JP); Yoshiki Ueyama, Osaka (JP)

(73) Assignee: Toyota Mapmaster Incorporated, Aichi (JP)

( * ) Notice: Subject to any disclaimer, the term of this patent is extended or adjusted under 35 U.S.C. 154(b) by 867 days.

(21) Appl. No.: 11/992,689

(22) PCT Filed: Aug. 24, 2007

(86) PCT No.: PCT/JP2007/066413
§ 371 (c)(1),
(2), (4) Date: Mar. 27, 2008

(87) PCT Pub. No.: WO2008/026510
PCT Pub. Date: Mar. 6, 2008

(65) Prior Publication Data
US 2009/0085923 A1 Apr. 2, 2009

(30) Foreign Application Priority Data
Aug. 30, 2006 (JP) .................................. 2006-232924

(51) Int. Cl.
*G06K 9/36* (2006.01)
(52) U.S. Cl. ...................................................... 382/284
(58) Field of Classification Search .................. 382/284; 386/227; 701/208, 213
See application file for complete search history.

(56) References Cited

U.S. PATENT DOCUMENTS

| | | | |
|---|---|---|---|
| 5,523,765 A * | 6/1996 | Ichikawa ...................... | 342/451 |
| 6,266,442 B1 * | 7/2001 | Laumeyer et al. ............ | 382/190 |
| 7,161,616 B1 | 1/2007 | Okamoto et al. | |
| 2001/0051850 A1 * | 12/2001 | Wietzke et al. ................ | 701/207 |
| 2002/0019697 A1 * | 2/2002 | Cong et al. .................... | 701/207 |
| 2002/0186865 A1 * | 12/2002 | Retterath et al. .............. | 382/104 |
| 2005/0074143 A1 * | 4/2005 | Kawai ........................... | 382/104 |
| 2005/0143889 A1 * | 6/2005 | Isaji et al. ...................... | 701/70 |

FOREIGN PATENT DOCUMENTS

| | | |
|---|---|---|
| JP | 2000-74669 | 3/2000 |
| JP | 2001-357386 | 12/2001 |
| JP | 2002-157590 | 5/2002 |
| JP | 2003-123197 | 4/2003 |
| JP | 2010224930 A * | 10/2010 |
| JP | 2010271969 A * | 12/2010 |
| WO | WO 00/64175 | 10/2000 |

* cited by examiner

*Primary Examiner* — Gregory F Cunningham
(74) *Attorney, Agent, or Firm* — Paul A. Levy; Matthew K. Ryan; Frommer Lawrence & Haug LLP

(57) ABSTRACT

[Object]
To provide a system that is able to generate road images with the effects of obstructions such as parked vehicles eliminated.
[Solution means]
A road image generating system which films road surfaces via an optical system mounted on a vehicle and generates road images by synthesizing the display contents of particular pixels in the road surface images obtained, and in which the display contents of multiple pixels obtained by filming of the same road surface at differing times and/or with differing optical systems are blended.

5 Claims, 9 Drawing Sheets (A) FILMED IMAGE OF STANDARD PATTERN $(X_{pn}, y_{pn})$ $(X_{p0}, y_{p0})$ (B) STANDARD PATTERN $(X_{cn}, y_{cn})$ $(X_{c0}, y_{c0})$

L

OPTICAL SYSTEM (C) VEHICLE

ROAD IMAGE CREATION SYSTEM

TECHNICAL FIELD

The present invention relates to a road image generating system.

BACKGROUND ART

There is a need to acquire from road images the information (such as road markings drawn in the center of roads) that is necessary for map data used in car navigation systems and the like. One method of doing so is to take aerial photographs from midair using an aircraft or the like, and to create, by orthorectification of the aerial photographs taken, road images as viewed directly from above. But with the method of taking aerial photographs from midair, if the aerial photographs are taken when vehicles or other obstructions are present on the roads, the aerial photographs will contain vehicles and it is not possible to create road images that are high in precision. Neither is it possible to photograph the road markings painted beneath such obstructions. Even supposing it is possible to depict the road markings (for example S-T-O-P), there will be large error in the distances between the letters, and the images will be difficult to use for map data.

On the other hand, inventions have been made whereby a super wide angle CCD camera is mounted on a vehicle and films the road markings on the road surface (see for example Patent Document 1).

[Patent Document 1]
Japanese Patent Application Publication No. JP-A-2003-123197

DISCLOSURE OF THE INVENTION

Problem to be Solved by the Invention

However, the purpose of the inventions whereby road markings are filmed with a CCD camera is to recognize road markings; the images filmed do not have geographical coordinates associated therewith and cannot be utilized as map data for car navigation systems.

Accordingly, the present inventors made a series of investigations into systems for creating road images by filming road surfaces with which geographical coordinates are associated and synthesizing the images filmed; and as a result discovered the following problem to be solved.

Namely, it is not only the filming vehicle that is present on the road, and other vehicles and the like are parked thereon. Thus, because of such other vehicles and the like, the road markings that are the primary requirement may not appear in the road surface images filmed. Road images generated using such road surface images is inadequate.

In such cases the road surface images may be filmed again after the vehicles have moved, that is, in the state where the road surface markings that have been obscured by the vehicles reappear and become filmable. But if this is done, a situation is liable to arise in which other road surface markings are hidden by other vehicles and the like and become unfilmable.

Accordingly, it is an object of the present invention to provide a system that is able to generate road images with the effects of obstructions such as other vehicles eliminated.

Means for Solving the Problem

In order to solve the above problem, a road image generating system of the present invention is so structured as to include:

relative position identifying means that uses an optical system fixed to a vehicle to film a standard pattern in a particular positional relation from the vehicle, and on the basis of the standard pattern filmed, identifies the relative positions, from the vehicle, of portions of road surface that are to be depicted by particular pixels of images filmed by the optical system, vehicle position identifying means that identifies the position of the vehicle during filming by the optical system, means that, on the basis of the vehicle position identifying means and the relative position identifying means, identifies the absolute positions of road surface portions that are depicted by particular pixels in road surface images filmed by the optical system, and generates road images by synthesizing the road surface portions for which such absolute positions have been identified, and blending means that, when there exist multiple pixels that depict road surface portions with identical absolute positions, blends display contents of such pixels.

According to such first aspect of the present invention structured in such manner, a standard pattern drawn on the road surface at a certain position from the optical system (at a position at a certain distance from the optical system) is filmed using an optical system fixed to the vehicle. During such filming, a lens is used as part of the optical system. The standard pattern that is depicted via the lens is a distorted standard pattern.

Pixels including particular portions of the standard pattern depicted in the images filmed are matched with coordinates on the road surface at such portions in the standard pattern. If a checker pattern is employed for the standard pattern, the gridpoints of the checker pattern drawn on the road surface are matched with the pixels at which such gridpoints are present in the images taken of the standard pattern. Since the coordinate for each gridpoint drawn on the road surface is determined from the viewpoint of the optical system fixed to the vehicle, it is understood that the pixels depicting each gridpoint in the images filmed always represent a portion of the road surface at a particular position viewed from the vehicle. Because of this, the images (portions of the road surface) depicted by particular pixels in the images filmed can be matched with the coordinates for such portions on the road surface viewed from the vehicle.

The vehicle in this system is also equipped with means for identifying geographical coordinates. Hence, it is able to identify the absolute positions of the coordinates for the portions of road surface depicted by particular pixels. Thus, road images can be generated by synthesizing the portions of road surface (for which absolute positions are identified) that are depicted by the pixels, and such road images are capable of being applied in a car navigation system.

When multiple pixels are present that depict the same portions of road surface (road surface portions with identical absolute positions), the display contents of the pixels are blended. Thereby, even if the road surface portion in question is hidden by an obstruction such as another vehicle at the first pixel (instead of the road surface, part of a vehicle is depicted by the first pixel), nevertheless, provided that the road surface portion in question is depicted by a second pixel, then by blending the display contents of the first and second pixels, at least the display contents of the second pixel are reflected and the data is useful for road images.

Such blending of the display contents of pixels can be performed via simple processing. On the other hand, considerable amounts of effort are required to have road markings that are hidden by obstructions reflected in the road images by means of manual work.

In an embodiment of the present invention, the method of blending is to take the average of brightness. It is also possible to focus on the fact that road markings are painted in such colors as white and orange, and to blend the display contents of the pixels so that these colors are emphasized.

In the foregoing, should both the first and second pixels depict an obstruction, then however the two are blended it will not be possible to obtain useful data (road markings). Accordingly, the first and second pixels preferably represent the same road surface filmed with differing times or from differing directions.

To carry out the filming with differing times, optical systems are disposed at the front and rear of the vehicle, or multiple filmings of the same road are made on or at differing days or times, for example. For filming from differing directions, it is conceivable that multiple optical systems are disposed widthwise on the vehicle, or repeated filmings are made while traveling along differing lanes in the road.

In the foregoing, the standard pattern is preferably a checker pattern.

The checker pattern is preferably a pattern combining white squares and black squares arrayed alternately. With such checker pattern as the standard pattern, it is easy to identify the coordinates for the gridpoints (vertices) of the squares composing the checker pattern.

Note that the standard pattern is not limited to a checker pattern of squares, but may be one of rectangles. Neither is the standard pattern limited to a checker pattern; any regularity-possessing pattern (of grids or dots) may be used therefor.

In the foregoing, it is preferable that a fisheye lens is employed for the optical system.

By employing a fisheye lens as the optical system, filming in all directions around the lens periphery is enabled. Hence, if the fisheye lens is installed with a method whereby it points in the traveling direction of the vehicle and projects out from the vehicle, it is possible even to film the road surface under the front edge of the vehicle (the road surface immediately beneath the numberplate). Thereby it is possible to film images that are unaffected by the shadows of vehicles traveling in front of the filming vehicle.

Further, since the fisheye lens enables all-around filming, the road markings, buildings and so forth located at the side of the road can also be filmed. Thereby, during editing of the images filmed it is possible to generate road images while comparing the geographical coordinates with the positions of the actual road markings and buildings, and hence it is possible to generate road images of high precision.

Note that two or more optical systems (fisheye lenses) may be mounted on the vehicle. By installing optical systems at the front and rear of the vehicle, images unaffected by shadows of buildings and other vehicles may be selected out from among the images filmed by the two optical systems. Also, in cases where backlight exerts effects, images unaffected by the backlight may be selected.

In the foregoing, the optical system includes a fisheye lens and a CCD camera that films the light that has passed through the fisheye lens, and the CCD camera is oriented so that smears arising during filming occur in the horizontal direction.

When a CCD camera is installed ordinarily, smears (bright lines) occur in the longitudinal direction on the screen when intense light such as sunlight shines into the CCD camera. Hence, images containing smears cannot be utilized as input material. But with the present invention, it is road surface images that are utilized, and therefore it is exclusively the lower half of the images filmed that is required.

Accordingly, the CCD camera is installed transversely, so that smears occurring in the CCD camera occur in the lateral direction on the screen. Also, by adjusting the installation angle of the CCD camera so that the smears occur in the upper half of the screen, road surface images that are unaffected by the smears can be obtained.

In the foregoing, it is preferable to further provide a light-emitting body that is disposed in such a position as to be filmable by the optical system, and the light-emitting body is preferably unlit during filming of road surface images to be used for road image generation, and lit at other times.

The light-emitting body (for example, an LED element) is synchronized with a recording switch, and is extinguished when the switch is turned on, the timepoints when the light-emitting body is extinguished serving as the startpoints of the measurement stretches. Subsequently, when recording of a measurement stretch ends, the recording switch is turned off and the light-emitting body is lit. Thereby, during the operation of editing the images filmed it is possible to judge the presence or otherwise of a measurement stretch via the lit/unlit state of the light-emitting body, and hence the efficiency of the editing operation is improved.

Note that the lighting and extinguishing of the light-emitting body need not necessarily be synchronized with the start and end of recording. To improve the efficiency of the road surface image editing operation, the LED element may be extinguished after recording is started, when the vehicle reaches the startpoint of the measurement stretch. Or recording may be ended after the LED element is lit. In this way, the editing operation may be carried out more efficiently by including images from before and after the measurement stretch.

The technical concepts above may be expanded into the following:

a road image generating system that films road surfaces via an optical systems mounted on a vehicle and generates road images by synthesizing the road surface images obtained, in which:

multiple road surface images obtained by filming of the same road surface at differing times and/or with differing optical systems are blended.

Such blending may alternatively be averaging of the brightness.

DESCRIPTION OF THE REFERENCE NUMERALS

10 ROAD IMAGE GENERATING SYSTEM
13 FISHEYE LENS
14 DV CAMERA
17 GPS ANTENNA
31 MEMORY SECTION
100 VEHICLE

Embodiment

Figure 1:
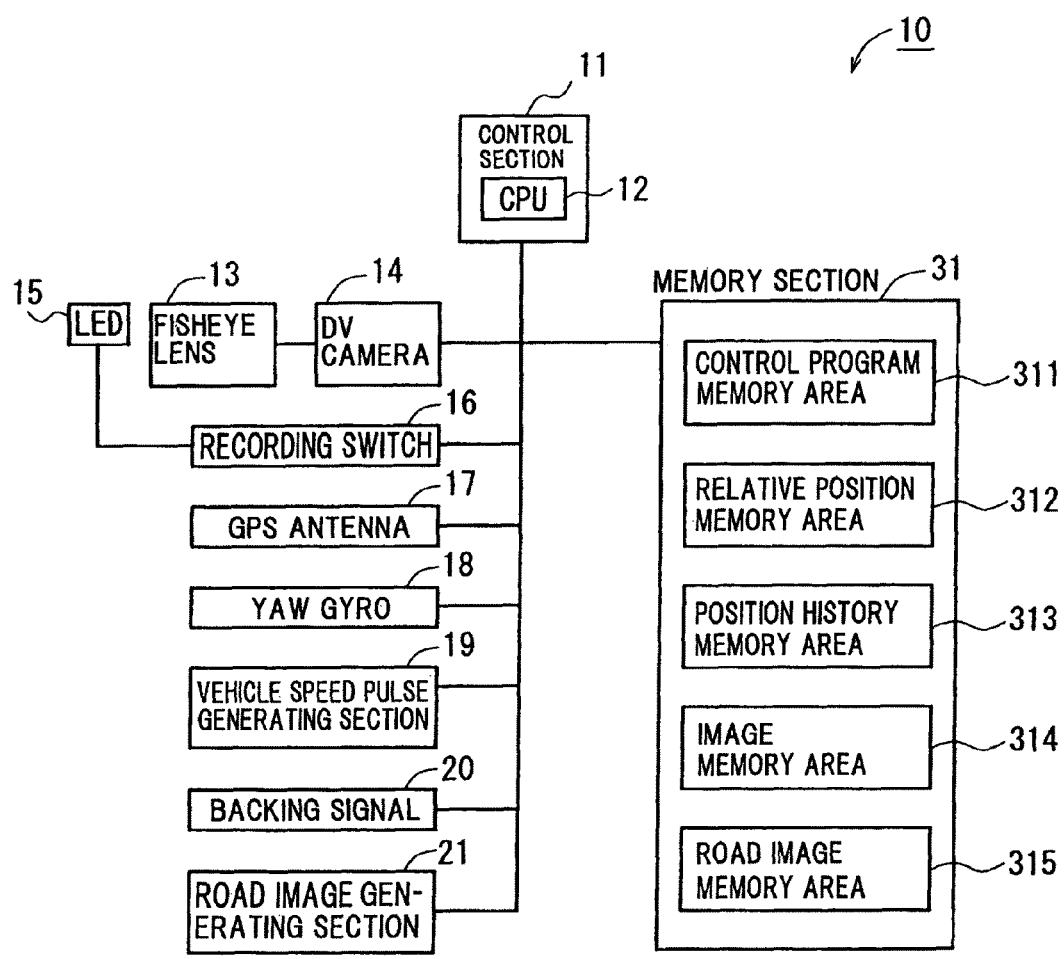
FIG. 1 is a structural diagram of a road image generating system 10 in an embodiment of the present invention.
Figure 2:
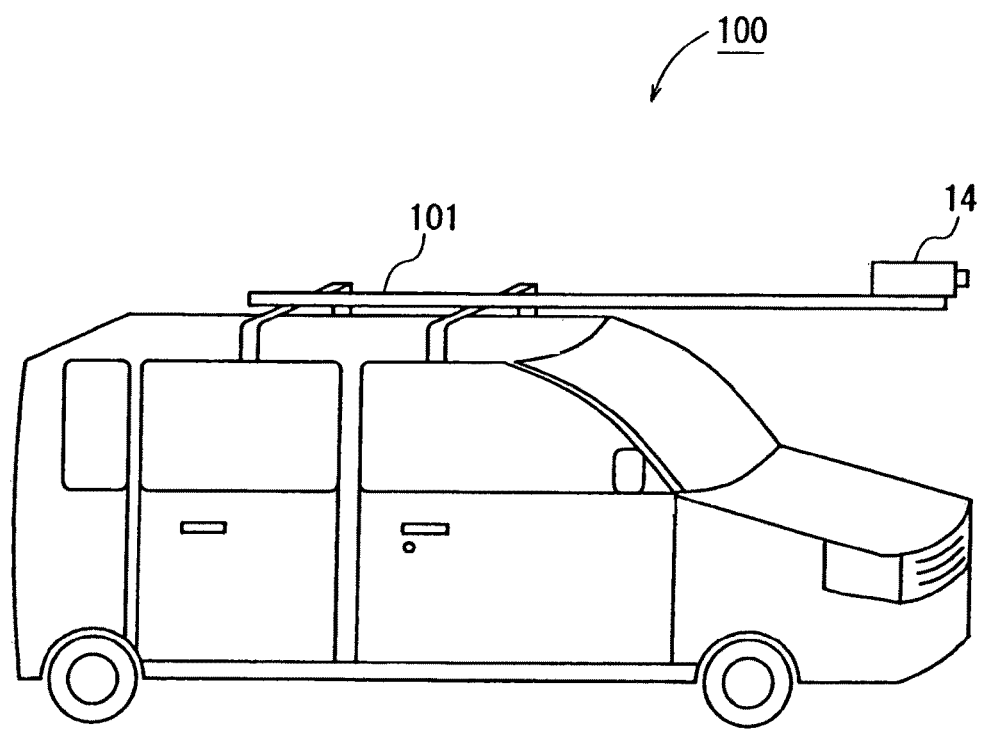
FIG. 2 is a side view of a vehicle 100 carrying a DV camera 14 equipped with a fisheye lens 13.
Figure 3:
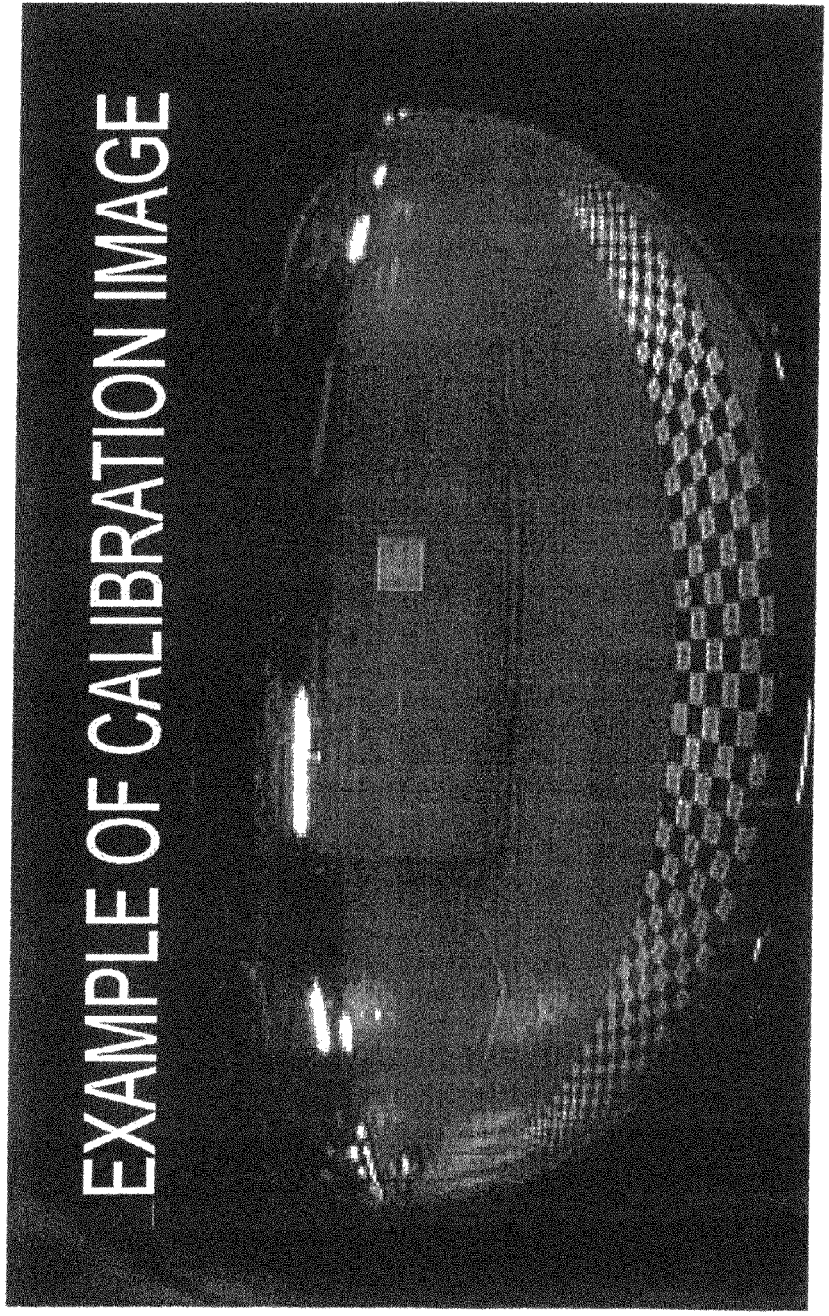
FIG. 3 is a photograph taken by means of the fisheye lens 13 and including a standard pattern.

FIG. 1 is a structural diagram of a road image generating system 10 used in an embodiment of the present invention. FIG. 2 is a side view of a vehicle 100 carrying a DV camera 14 equipped with a fisheye lens 13. FIG. 3 is a photograph taken by means of the fisheye lens 13 and including a standard pattern.

The road image generating system 10 includes the DV camera 14 equipped with the fisheye lens 13, an LED element 15 disposed so as to shine into the fisheye lens 13, a recording switch 16, a GPS antenna 17, a yaw gyro 18, a vehicle speed pulse generating section 19, a backing signal 20, a road image generating section 21 and a memory section 31.

The DV camera (with built-in CCD camera) is used for filming motion pictures of the road surface. This DV camera 14 is equipped with the fisheye lens 13. The fisheye lens 13 is able to capture all-around images, and can film the lane currently traveled and adjacent lanes, signs set up on the road, and the street adjacent to the lanes.

The CCD camera built into the DV camera 14 is installed transversely. Thereby, the smears that occur when light with strong brightness (such as sunlight) shines into the CCD camera can be made to occur horizontally in the images filmed. Further, by adjusting the orientation of the installation angle of the DV camera 14, the smears can be prevented from appearing in the images filmed.

The recording switch 16 is used for lighting and extinguishing the LED 15 that is for determining the startpoint and endpoint of the measurement stretches. Also, the recording switch 16 on and off data (in other words, the LED 15 unlit/lit data) are associated with the position history data and facilitate identification of the geographical coordinates for the measurement stretch startpoints and endpoints.

When the vehicle reaches a measurement stretch startpoint, the recording switch 16 is turned on and the LED 15 is extinguished. The LED 15 remains extinguished all the time that the measurement stretch is traveled through, and therefore the light from the LED 15 does not appear in the images filmed. On the other hand, when the measurement stretch endpoint is reached, the recording switch 16 is turned off and the LED 15 is lit.

The GPS antenna 17 is used as vehicle position identifying means. The GPS antenna 17 can be made to operate in synchrony with the recording switch. When the recording switch is turned on, the GPS antenna 17 identifies the vehicle's geographical coordinates. The geographical coordinates identified for the vehicle are stored in a position history memory area 313.

The yaw gyro 18 gauges the vehicle's yaw direction (the vehicle's orientation in the lateral direction). The vehicle's geographical coordinates can be identified by gauging data on the vehicle's lateral movements when the vehicle encounters an obstruction (such as a bicycle) while traveling through a measurement stretch.

The vehicle speed pulse generating section 19 emits a pulse each time that the vehicle advances by a particular interval. The vehicle's advancement distance is determined by storing the number of such pulses. More precisely, it is used for determining relative positions from the geographical coordinates initially identified for the vehicle.

The backing signal 20 is used for having the vehicle speed pulse generating section 19 reflect the distance backed by the vehicle and thereby determining the relative position from the geographical coordinates initially identified.

Because the images filmed by means of the fisheye lens 13 are distorted, images of the road viewed from directly above cannot be generated merely by synthesizing such distorted filmed images. Accordingly, at the road image generating section 21 the coordinates for the road surface to be depicted by particular pixels in the images filmed are identified, and road images are generated by allocating the brightnesses of such pixels to the coordinates identified.

The memory section 31 includes a control program memory area 311, a relative position memory area 312, a position history memory area 313, an image memory area 314, and a road image memory area 315.

The control program memory area 311 is an area in which a control program for controlling the CPU 12 included in the control section 11 is stored. The various elements composing the road image generating system 10 are connected to the CPU 12 via buses, and carry out their particular operations in accordance with the control program, which runs the CPU 12.

The relative position memory area 312 stores the relations between particular pixels in the filmed images and the coordinates for the road surface portions depicted by such pixels. These road surface coordinates are relative positions with regard to the vehicle.

The position history memory area 313 stores vehicle position history data obtained via the GPS antenna 17, the yaw gyro 18, the vehicle speed pulse generating section 19 and the backing signal 20. For such position history data, first the vehicle's geographical coordinates are determined via the GPS antenna 17. Data indicating the lateral slant, the vehicle speed pulse count, and the vehicle's backing are then associated with the geographical coordinates determined, and are stored. By reading out these data, the vehicle's geographical coordinates within a measurement stretch can be identified.

The image memory area 314 is an area that stores the road surface images filmed by the DV camera 14. The road surface images filmed are associated with the geographical coordinates for the vehicle that have been stored in the position history memory area 313, and are stored. Thus, it is possible to identify the absolute positions for the road surface portions depicted by particular pixels in the road surface images stored in the image memory area 314.

FIG. 2 is a side view of the vehicle 100 carrying the DV camera 14 equipped with the fisheye lens 13. An extension rod 101 is fixed to the top of the vehicle 100, and the DV camera 14 is fixed to the end of the extension rod 101. The DV camera 14 is, to the extent possible, preferably be fixed in a position so as to be disposed over the front edge of the vehicle, so that the space directly beneath the vehicle's front edge can be filmed. This is because the space directly beneath the vehicle's front edge is not prone to effects from vehicles traveling in front (such as shadows of vehicles driving in front).

Also, by installing in a precisely transverse orientation the CCD camera provided in the DV camera 14, and furthermore adjusting the angle at which the CCD camera is installed relative to the road surface, it can be effected that no smears will appear in the lower half of the filmed images, in which the road exclusively will be depicted.

The DV camera 14 fixed to the extension rod 101 is connected, so as to be able to communicate therewith, to the road image generating system 10 mounted in the vehicle interior, and the images filmed by the DV camera 14 can be stored in the memory section 31.

FIG. 3 is an example of a photograph showing a standard pattern depicted through the fisheye lens 13. The white patternings and black patternings at the bottom of the photograph are alternately combined, with the portion that is warped into an arc constituting the standard pattern. By using the fisheye lens 13 in this manner, the spaces in front of, at both sides of, and directly beneath the fisheye lens 13 can be filmed.

Figure 4:
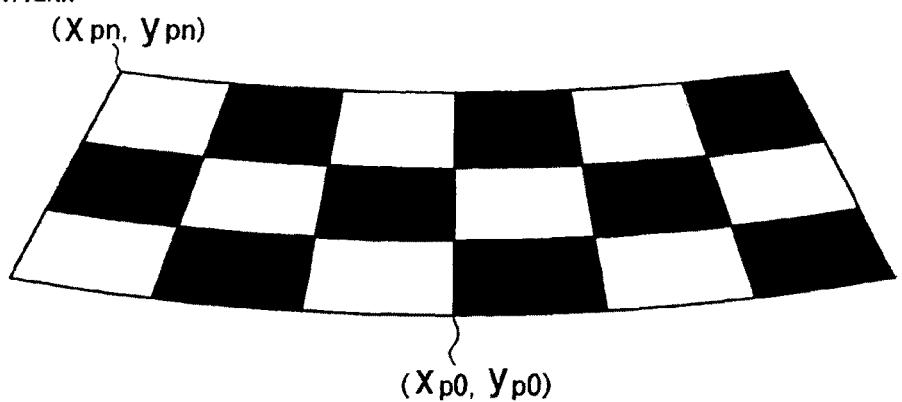
FIG. 4(A) is a graphic of a standard pattern, filmed by means of the fisheye lens.
FIG. 4(B) is a standard pattern.
FIG. 4(C) is a vehicle carrying an optical system equipped with a fisheye lens.
Figure 4:
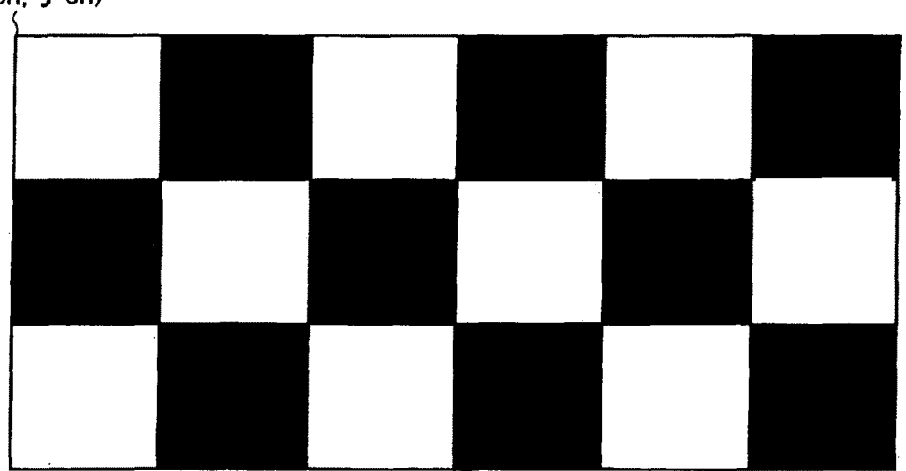
Figure 4:
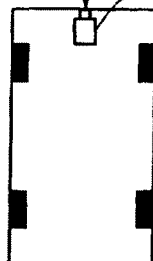

FIG. 4(A) is a schematic diagram of a standard pattern taken by means of the fisheye lens. FIG. 4(B) is the standard pattern viewed from directly above, enabling identification of the coordinates on the road surface seen from the vehicle (FIG. 4(C)). The pixels $(x_{p0}, y_{p0})$ and $(x_{pn}, y_{pn})$ in FIG. 4(A), for example, correspond to the (relative) coordinates $(x_{c0}, y_{c0})$ and $(x_{cn}, y_{cn})$ in FIG. 4(B).

Figure 5:
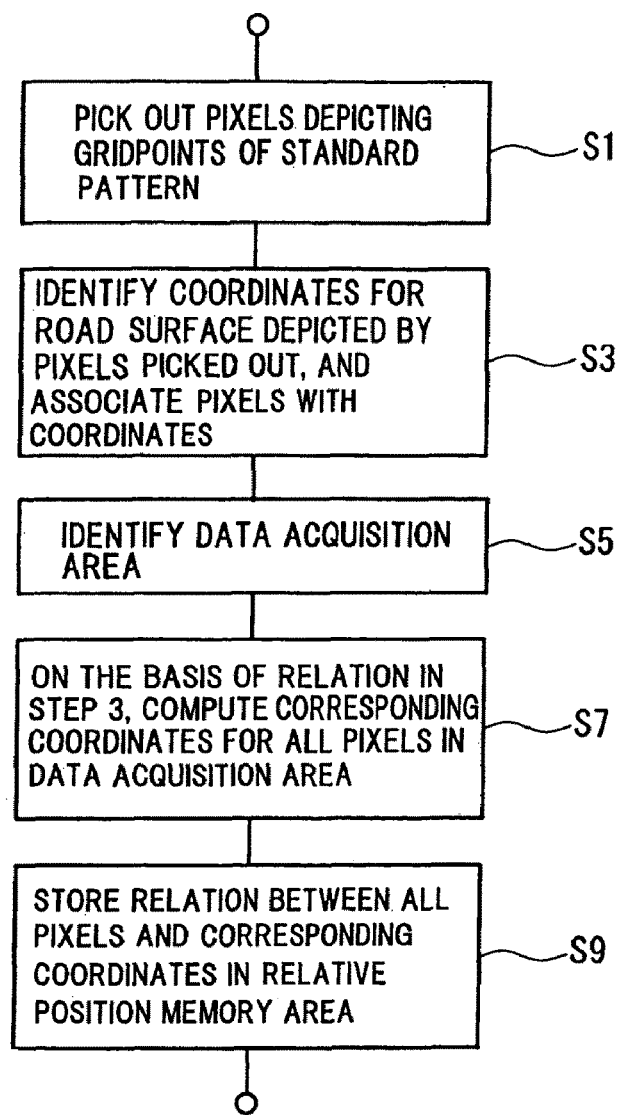
FIG. 5 is a flowchart explicating the operations for identifying the relative positions from the vehicle to the standard pattern.

FIG. 5 is a flowchart that explicates the processing for identifying the relation between the images to be depicted by the pixels of the images filmed, and the coordinates for the road surface in such images (relative positions from the vehicle), on the basis of the standard pattern.

First, the pixels depicting the gridpoints of the checker pattern are picked out in the filmed images of the standard pattern (step 1). Then the road surface coordinates for the checker pattern gridpoints depicted by the pixels picked out (relative positions from the vehicle) are identified, and the pixels depicting the gridpoints are associated with the coordinates for such on the road surface (step 3).

In step 5, the area for which data are to be acquired in the filmed images is identified. In the present embodiment the area where the standard pattern appears (which is crescent moon shaped in the filmed image, see FIG. 3) is taken as such data acquisition area. The data acquisition area can be determined as desired.

In step 7, with the relation found in step 3 (relation between the gridpoint pixels and the coordinates thereof) as reference, the coordinates for the road surface portions to be depicted by all the pixels composing the data acquisition area are found via computation using a well-known method such as linear interpolation or the like. There is no particular restriction on the computation method. The relation thus found between the pixels and the coordinates for the road surface portions depicted thereby is stored in the relative position memory area 312.

Figure 6:
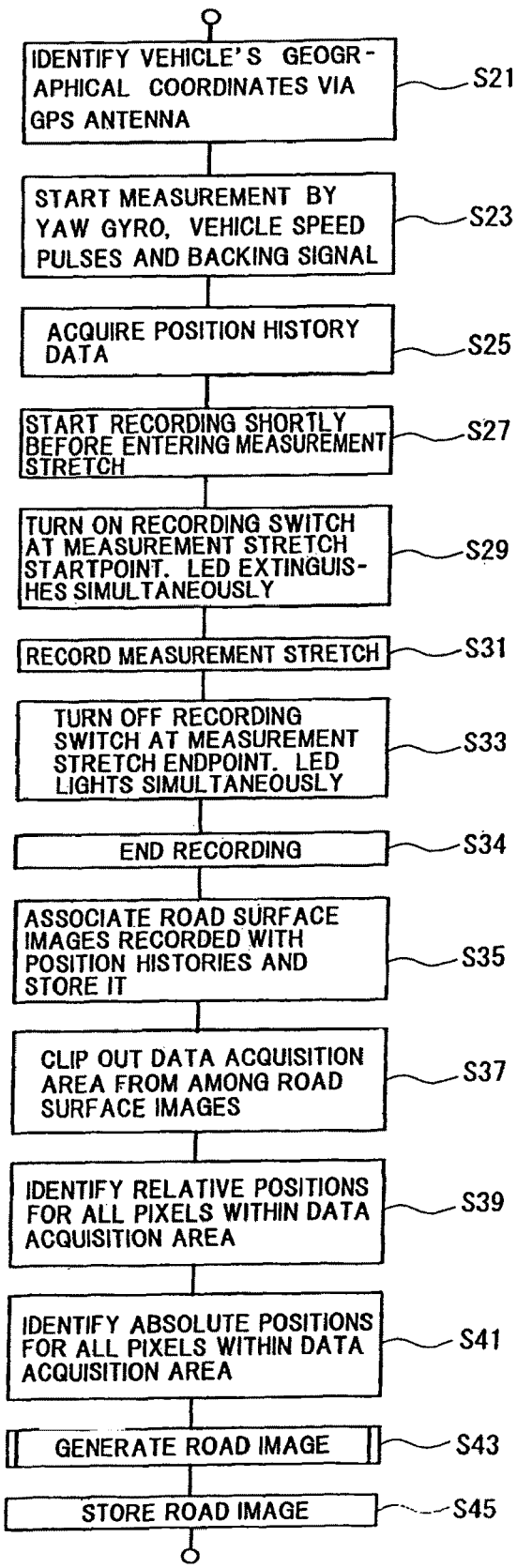
FIG. 6 is a flowchart illustrating the operations whereby the vehicle 100 carrying the road image generating system 10 acquires the road surface data and generates the road images.

FIG. 6 is a flowchart illustrating the processing whereby the vehicle 100 carrying the road image generating system 10 is run and actually films the road surface, and road images are generated using the road surface images.

When the vehicle 100 reaches the measurement stretch startpoint, the geographical coordinates for the vehicle 100 are acquired from the GPS antenna 17 (step 21). The geographical coordinates acquired are stored in the position history memory area 313. Simultaneous with acquisition of the geographical coordinates, measurement via the yaw gyro 18, the vehicle pulse generating section 19 and the backing signal 20 starts (step 23). After measurement starts, the position histories (the yaw gyro 18, the vehicle pulse generating section 19 and the backing signal 20) are stored in the position history memory area 313 at particular times (step 25).

Meanwhile, recording is carried out by the DV camera 14, the recording starting before the measurement stretch is entered (step 27). At this point, the LED 15 is in the lit state. Subsequently, when the vehicle 100 reaches the measurement stretch startpoint, the LED 15 is extinguished by the recording switch 16 being turned on (step 29). Then recording of the desired measurement stretch is carried out (step 31). When the measurement stretch endpoint is reached, the recording switch 16 is turned off and the LED 15 is lit (step 33), after which the recording is ended (step 34).

The images filmed are associated with the position histories obtained in steps 21 and 23, and stored in the image memory area 314 (step 35). Because the images taken by the DV camera are stored as motion pictures, still images are extracted at particular times for use as road surface images. Such times are made identical with those at which the vehicle position histories are acquired. This is because thereby the vehicle's positions at the times when the still images are acquired can be identified. Note that image numbers 1 to T are assigned to the road surface images in the temporal sequence in which they were taken.

Then the data acquisition area is clipped out from among the road surface images (step 37). For all the pixels composing the data acquisition area clipped out, the image depicted by each pixel and the coordinate therefor on the road surface (relative position) are identified by referring to the relations stored in the relative position memory area 312 (step 39). Since these coordinates become map data coordinates (absolute positions) via referencing of the vehicle position histories recorded in the position history memory area 313, the absolute coordinates for the road surface portions depicted in all the pixels composing the data acquisition area are identified in step 41.

Figure 7:
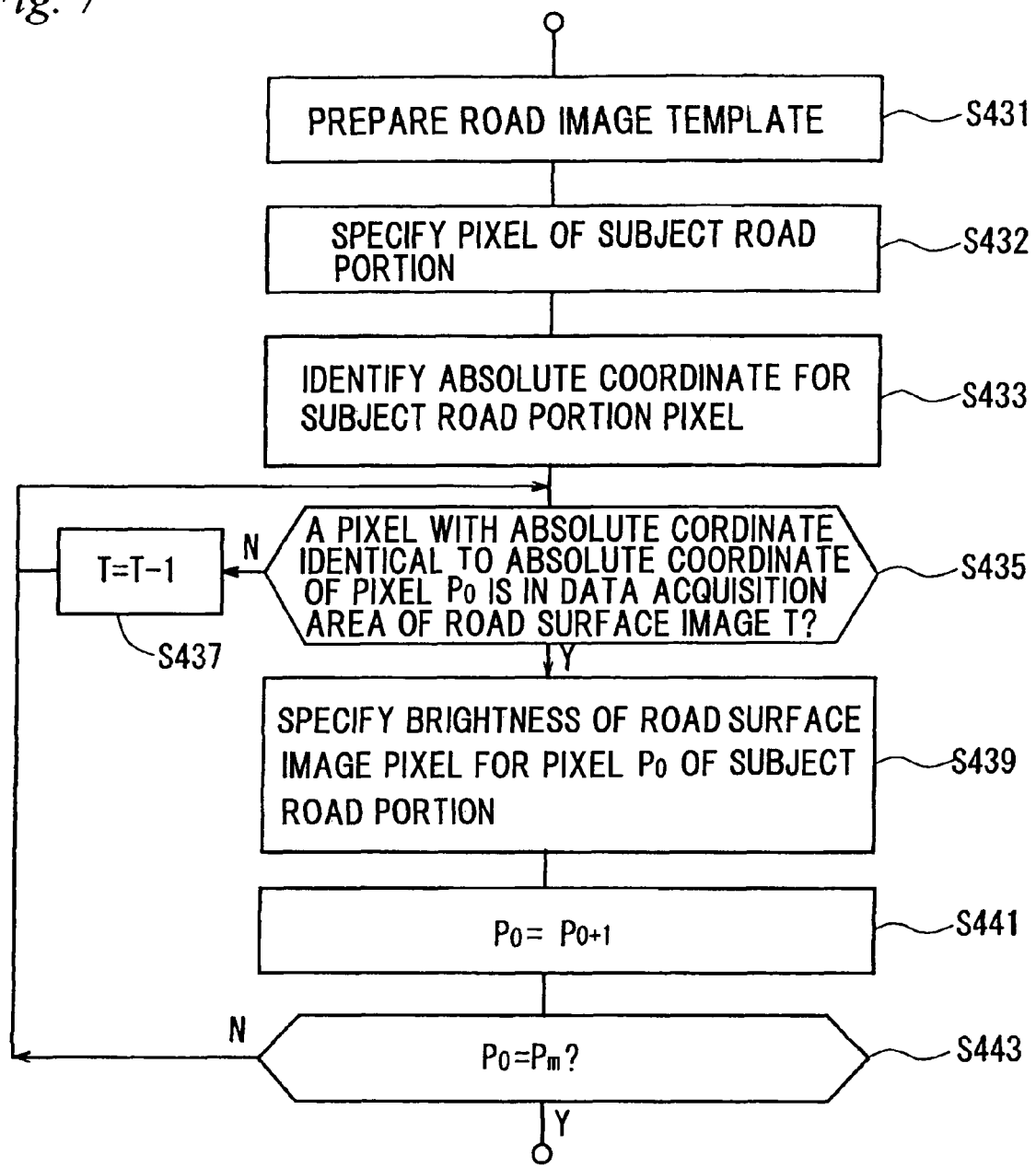
FIG. 7 is an example of a road image actually generated using the road image generating system.

In step 43, the road images are formed using the relation between the road surface images and the absolute coordinates identified for the pixels thereof. FIG. 7 shows step 43 in detail.

Figure 8:
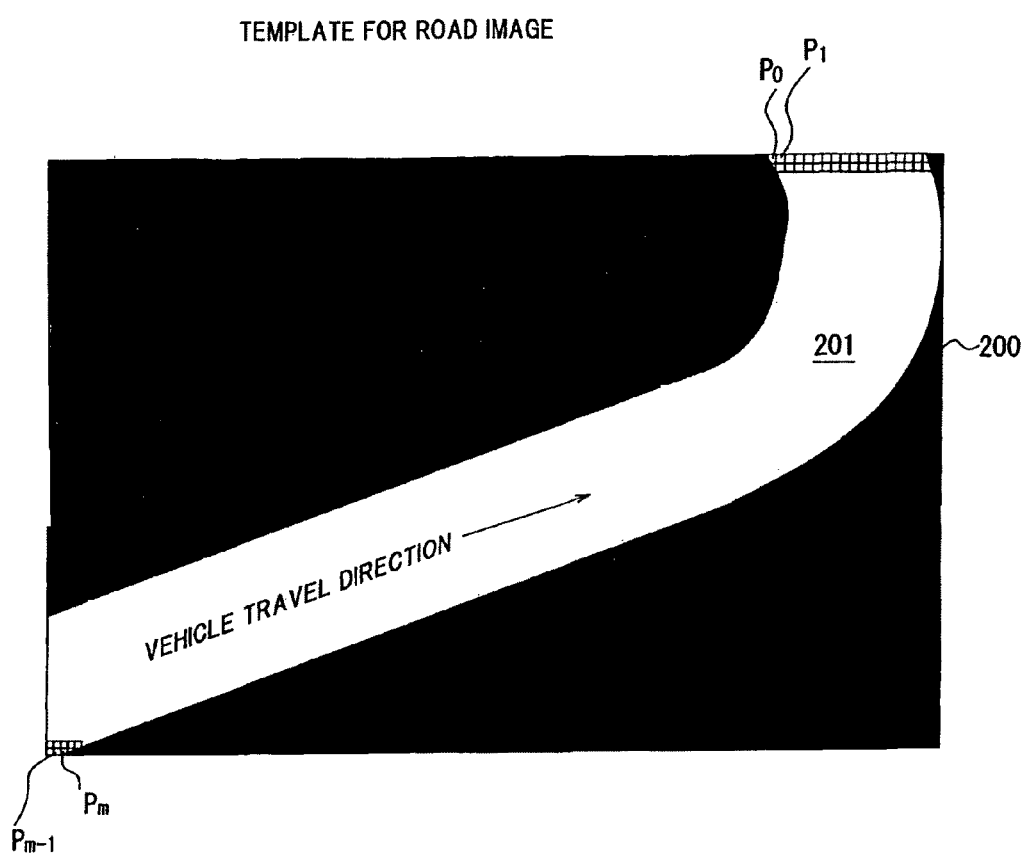
FIG. 8 illustrates a mode of blending the pixels composing a road surface image.

In step 431 a template 200 for the road images is prepared. This template 200 constitutes an image, is assigned absolute coordinates for all the pixels on the basis of ordinary road data, and initially has all the pixels colored black. The default brightness for each pixel in the template 200 can be specified as desired. Next, the pixels corresponding to the subject road portion (road that is the subject of the road image to be prepared) in the template 200 are specified (step 432). In FIG. 8 such subject road portion is illustrated conceptually by being shown as a white portion 201.

In step 433 the absolute coordinates for the pixels of the subject road portion 201 are identified, and in step 435 the road surface images are scanned, in the sequence of filming, from newest (image number T) to oldest (that is, image numbers T-1, T-2, T-3 . . . 2, 1), for presence/absence of an absolute coordinate identical to the absolute coordinate for the pixel $P_0$ at the left end of the top edge of the subject road portion 201. When a road surface image is found that has in the data acquisition area thereof an absolute coordinate identical to the pixel $P_0$ of the subject road portion 201, the remaining scanning is omitted (step 437). In this way, the pixel with the corresponding absolute coordinate in the newest road surface image in the filmed sequence is identified, and therefore the brightness of such pixel is read out and such brightness is specified as the brightness of the pixel $P_0$ of the subject road portion 201 (step 439).

In the present embodiment, steps 435 to 439 are repeated successively for the pixels of the template from $P_0$ at the left end of the top edge to $P_m$ at the right end of the bottom edge (steps 441, 443).

Figure 9:
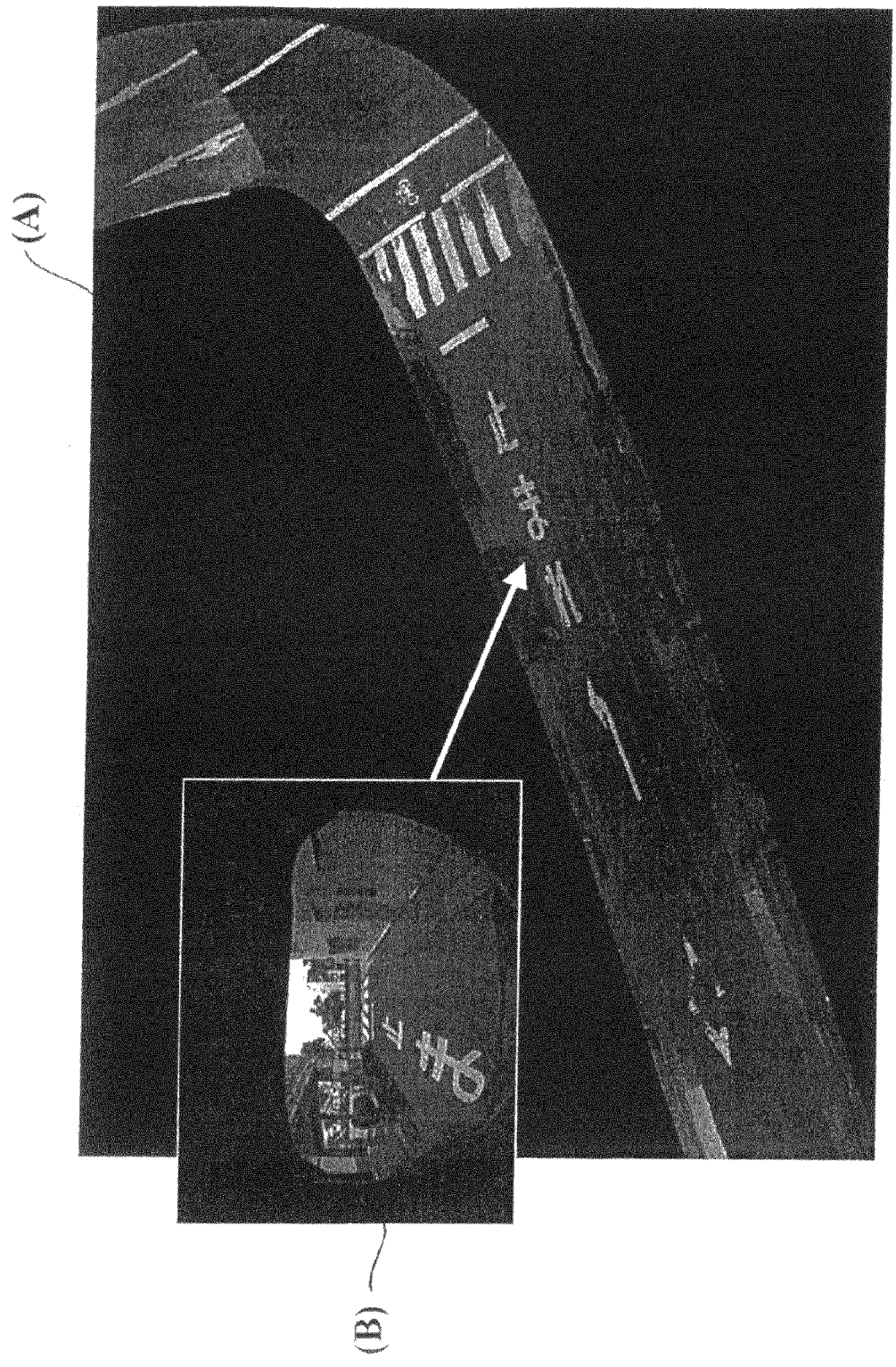
FIG. 9 illustrates another mode of blending the pixels composing a road surface image.

An example of a road image obtained in such manner is shown in FIG. 9(A). FIG. 9(B) shows an example of a road surface image.

Returning to FIG. 6, the road image is stored in step 45.

In the present embodiment the optical system is installed at the front end of the vehicle, and consequently the brightnesses of the pixels of the most recently taken road surface images are employed for the brightnesses of the pixels of the subject road portion 201. Thereby, road surface images of the road surface portions corresponding to the absolute coordinates of the pixels of the subject road portion 201 that have been filmed from the closest distance can be employed, and the brightness thereof specified. Hence, the effects of errors such as road surface inclination and vehicle skew can be eliminated to the extent possible.

For similar reasons, if the optical system is installed at the vehicle's rear edge, the brightnesses of the pixels of the least recently taken road surface images is preferably employed for the brightnesses of the pixels of the subject road portion 201.

In the road images obtained in the embodiment (see FIG. 9), parked vehicles may appear. If such vehicles cover up important road surface markings (such as limit lines), the road images obtained are incomplete. In such cases, it is conceivable to reimplement the filming, but even then, there is no guarantee that the parked vehicles will disappear. Also, during the refilming, other important road surface markings may be covered up by other parked vehicles.

Accordingly, in the present embodiment steps 21 to 43 in FIG. 6 are reimplemented, and the average of the brightnesses of the pixels of the subject road portion 201 in the two road images obtained is computed. The brightness of the pixels thus obtained through computation is allocated to the corresponding pixels of a new template.

In the manner described above, the effects of obstructions such as vehicles can be eliminated by blending two road images, or more precisely by averaging the brightnesses of the pixels. The number of road images blended is not limited to two, but may be three or more. Also, besides simple averaging, any desired method such as weighted averaging, moving averaging or the like may be employed for the blending method.

The present invention is by no means limited to the foregoing preferred mode and embodiment. The invention encompasses many different variant modes that can be easily arrived at by those skilled in the art without departing from the scope of the claims.

What is disclosed is:
(1) Relative position identifying means that uses an optical system fixed to a vehicle to film a standard pattern in a particular positional relationship from the vehicle, and on the basis of the standard pattern filmed, identifies the relative positions, from the vehicle, of portions of road surface that are to be depicted by particular pixels of images filmed by the optical system, and
vehicle position identifying means that identifies the position of the vehicle during filming by the optical system; and
a road image generating system that identifies, on the basis of the vehicle position identifying means and the relative position identifying means, the absolute positions of road surface portions that are depicted by particular pixels in road surface images filmed by the optical system, and generates road images by synthesizing the road surface portions for which the absolute positions have been identified.
(2) A road image generating system according to claim 1, characterized in that the standard pattern is a checker pattern.
(3) A road image generating system according to claim 1 or 2, characterized in that the optical system includes a fisheye lens.
(4) A road image generating system according to claim 3, characterized in that the optical system includes the fisheye lens and a CCD camera that films light that has passed through the fisheye lens, the CCD camera being installed with an orientation altered so that smears arising during filming occur in the horizontal direction.
(5) A road image generating system according to any one of claims 1 to 4, further including: a light-emitting body that is disposed in such a position as to be filmable by the optical system, characterized in that the light-emitting body is unlit during filming of road surface images to be used for road image generation, and is lit at other times.

The invention claimed is:

1. A road image generating system comprising:
relative position identifying means that uses an optical system fixed to a vehicle to film a standard pattern in a particular positional relationship from said vehicle, and on the basis of said standard pattern filmed, identifies the relative position, from said vehicle, of road surface portions that are to be depicted by particular pixels of images filmed by said optical system;
vehicle position identifying means that identifies said vehicle's position during filming by said optical system;
means that, on the basis of said vehicle position identifying means and said relative position identifying means, identifies the absolute positions of road surface portions that are depicted by particular pixels in the road surface images filmed by said optical system, and generates road images by synthesizing the road surface portions for which said absolute positions have been identified; and
blending means that, when there exist multiple pixels of images filmed by said optical system that depict road surface portions with identical absolute positions, blends display contents of said pixels of images filmed by said optical system.

2. A road image generating system according to claim 1, wherein said blending means averages the brightness of said pixels that depict road surface portions with identical absolute positions.

3. A road image generating system that films road surfaces via an optical system mounted on a vehicle and generates road images by synthesizing the road surface images obtained, wherein
in multiple road surface images obtained by filming of the same road surface at differing times with an optical system or with differing optical systems or at a time with differing optical systems, when there exist multiple pixels of images filmed by said optical system or optical systems that depict road surface portions with identical absolute positions, said road image generating system blends display contents of said pixels of images filmed at differing times with said optical system or with said differing optical systems or at a time with said differing optical systems.

4. A road image generating system according to claim 3, wherein blending of said multiple road surface images is via averaging of the brightness of said pixels that depict road surface portions with identical absolute positions.

5. A road image generating method comprising:
preparing a template of a road image;
specifying a first pixel corresponding to a subject road portion in said template;

identifying the absolute coordinate for said first pixel;
reading out the brightness of a second pixel, in a first filmed road surface image, that has an absolute coordinate identical to said first pixel;
reading out the brightness of a third pixel, in a second filmed road surface image, that has an absolute coordinate identical to said first pixel; and
averaging the brightness of said second pixel in the first filmed road surface image and said third pixel in the second filmed road surface image, and allocating such average as the brightness of said first pixel in said template.

* * * * *